United States Patent

[11] 3,618,640

| [72] | Inventor | Adolf Linka<br>Kaiserstrasse 91, 7417 Pfullingen, Germany |
|---|---|---|
| [21] | Appl. No. | 849,342 |
| [22] | Filed | Aug. 12, 1969 |
| [45] | Patented | Nov. 9, 1971 |
| [32] | Priority | Aug. 16, 1968 |
| [33] | | Germany |
| [31] | | P 17 85 147.7 |

[54] MAGNETIC SHUTTLE DRIVE FOR CONTINUOUSLY PROGRESSING SHEDS IN WEAVING LOOMS
6 Claims, 3 Drawing Figs.

[52] U.S. Cl. ................................................. 139/134, 139/12, 139/188
[51] Int. Cl. ....................................................D03d 49/44, D03d 41/00, D03d 49/60
[50] Field of Search............................................ 139/134, 12, 188, 183

[56] References Cited
UNITED STATES PATENTS

| 2,647,542 | 8/1953 | Purdy ......................... | 139/134 |
| 2,799,295 | 7/1957 | Juillard et al. ................ | 139/12 |
| 3,114,398 | 12/1963 | Pfarrwaller................... | 139/134 X |
| 3,224,465 | 12/1965 | Fontaine ..................... | 139/12 |

FOREIGN PATENTS

| 19,745 | 1897 | Great Britain................ | 139/134 |
| 740,578 | 11/1955 | Great Britain................ | 139/183 |

*Primary Examiner*—James Kee Chi
*Attorney*—Flynn & Frishauf

ABSTRACT: The shuttle is supplied with permanent magnets having uniform spacing, and alternate poles; the travelling magnetic field is formed by a carrier holding a plurality of magnets of similar size and spacing to that of the magnets on the shuttle, so that, upon movement of the carrier, the shuttle will be carried along and attractive and repelling force components between shuttle and travelling field will cancel, and force components in the direction of the movement of the shuttle along the shuttle race will be additive.

MAGNETIC SHUTTLE DRIVE FOR CONTINUOUSLY PROGRESSING SHEDS IN WEAVING LOOMS

The present invention relates to a drive for the shuttle of a weaving loom, and more particularly to a magnetic drive for continuously progressing shed-type looms, in which a plural-pole magnetic guide field constrains the shuttle to follow the moving field, and thus moves the shuttle along.

Weaving looms having a continuously progressing shed require continuous drive for the shuttle. Mechanical drives which reach through the warp threads may damage the threads and are not suitable for the manufacture of finely woven, or very densely woven material.

It has previously been proposed to drive and guide the shuttle by means of magnetic forces. Magnetic drives have the advantage that the magnetic forces reach through the material of the threads, and into the shed, and interact with the shuttle, without in any way damaging, or affecting the warp threads. Movable magnets, or electromagnets providing a moving magnetic field, progressing along the path of the shuttle, or the shuttle race interact with magnetically responsive material associated with the shuttle itself, for example with an armature of soft iron applied to the shuttle, a plurality of soft-iron foils or plates secured to the shuttle, or with the shuttle itself if it is made of a magnetically responsive material. Such magnetic drives have previously been proposed, see, for example, German Patent Nos. 96,270; 31,375; 803,707 and discussion of solutions to continuously progressing sheds in "Deutsche Textiltechnik," Volume 18 (1968), issues 4 and 5, pp. 225 to 230 and continued at 281 to 287.

Magnetic drives as previously proposed have the disadvantage that the guiding and moving field, in addition, exerts force components on the shuttle in a direction transverse to the warp threads, which have the effect that the shuttle is pressed against the shuttle race. Additionally, the forces which can be transmitted to move the shuttle transverse to the warp threads are comparatively small. Further, the armature (if provided) or the shuttle itself may lag with respect to the moving field, causing loss of synchronism, since the magnetic forces primarily act in a direction perpendicular to the pole shoes, or pole faces of the armature, or the shuttle itself. In order to provide synchronous movement, and reliable interaction of the shuttle with the magnetic field, the magnetic field must be high, requiring large and expensive electric magnets which, additionally, contribute to the force components tending to press the shuttle against the shuttle race, increasing friction and resulting in friction losses. Shuttles suspended entirely in a magnetic field have been proposed; such arrangements require an additional drive to move the shuttle transverse to the warp threads, are difficult to adjust and lack reliability.

It is an object of the present invention to provide a shuttle drive in which the shuttle is reliably moved along its path under influence of a magnetic field, in which the severing forces of the shuttle with respect to the magnetic field are high, and in which the forces tending to press the shuttle against the shuttle race are a minimum, while avoiding use of expensive, and heavy, or operationally not entirely reliable equipment.

SUBJECT MATTER OF THE PRESENT INVENTION

Briefly, the shuttle is provided with a plurality of magnetic poles, of predetermined polarity, such as horseshoe-type permanent magnets, having a pole width, and pole separation which corresponds essentially to the pole width and pole separation a plurality of similarly spaced and arranged magnets mounted on a movable carrier; the strength of the magnets on the carrier interacting with the field from the magnets of the shuttle itself are so arranged with respect to the airgap and to each other that, upon movement of the carrier, attractive and repulsive forces of adjacent magnets of the carrier and the shuttle will oppose each other, and that the force component transverse to the intended direction of motion of the shuttle will be minimal, whereas the force components in a direction along the shuttle race, or the shuttle guide path tending to move the shuttle in synchronism with the carrier are in adding relationship, so that the forces between shuttle and moving field are enhanced thus providing for high severing forces between the shuttle and the magnets on the moving carrier. The force components acting in a direction transverse to the warp thread, that is to move the shuttle along its guide path, are so arranged that any lag, or slip of the shuttle with respect to the magnets on the carrier are immediately opposed by the interaction of the repelling and attracting fields, tending to immediately reestablish synchronous operation. In actual practice, the shuttle is constrained in a predetermined position with respect to the moving field by providing crossed magnetic fields, so that the severing forces tending to cause relative shift of the shuttle with respect to the moving field in a direction of the shuttle path are approximately doubled with respect to previously available forces, assuming equal magnetic field strength.

More than one set of magnets generating magnetic fields are provided to interact with the magnetic poles of the shuttle; for example, a second magnetic guiding field may interact with one, or a separate, additional set of magnets on the shuttle, having their poles arranged with respect to the field as aforesaid, to further increase the magnetic forces tending to move the shuttle while providing for opposition of forces tending to press the shuttle against the shuttle race.

The invention will be described by way of example with reference to the accompanying drawings, wherein.

Figure 3:
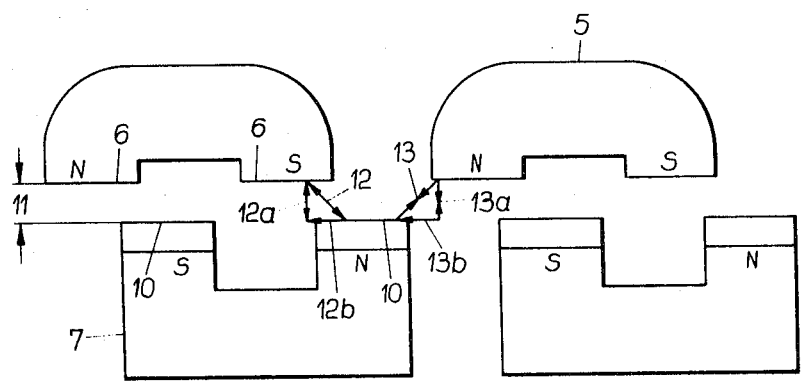

and FIG. 3 is a fragmentary view illustrating the magnetic forces when the carrier is moving to an enlarged scale.

The present invention has been illustrated schematically, and all parts of the weaving loom and not necessary for an understanding of the invention have been left off; a more complete disclosure of machines with which the present invention can be used may be found, for example, in U.S. Patent No. 2,144,749.

A shuttle 1 is movable over a shuttle race 3. Shuttle 1 has a smooth running surface 2 preferably formed of a low-friction material such as tetrafluorethelene, applied to the surface facing the shuttle race 3. The sliding surface is formed of a replaceable foil, or thin layer of low-friction material, so that the surface itself can readily be replaced after wear. The shuttle race 3 comprises the reed elements 3a, which extend in the direction of the warp threads 4, which are snugly applied to the reed. When the shuttle 1 moves across the reed elements 3a on its slide surface 2, warp threads 4 of the shed are pressed in the space between the reed elements, so that lateral shift of the warp threads, or damage thereto due to pressure is avoided. Sliding surface 2 distributes the pressure per unit area of the shuttle, caused by the magnetic force, over a surface which is much greater than when the shuttle has runner wheels. Runner wheels would be possible, however due to their high speed they cause substantial wear and sometimes have loose threads wrapped therearound causing complete blocking of the wheels. A sliding shuttle is self-cleaning with respect to dust and loose thread or lint.

Figure 1:
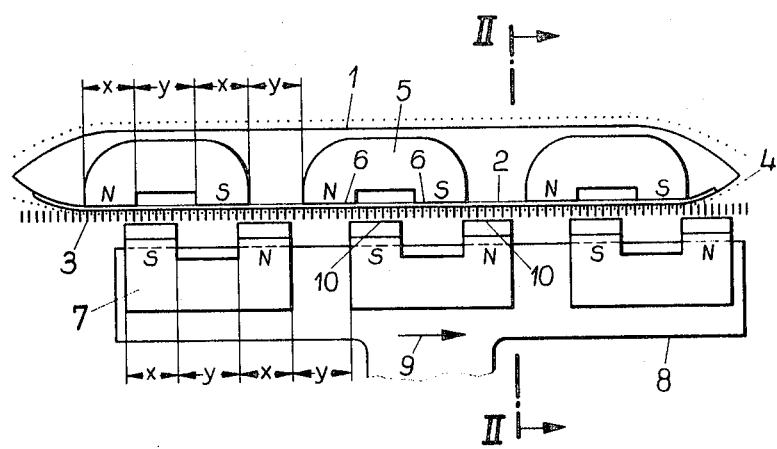
FIG. 1 is a schematic, longitudinal view of a shuttle, with the shuttle drive under operating conditions, in plan view.
Figure 2:
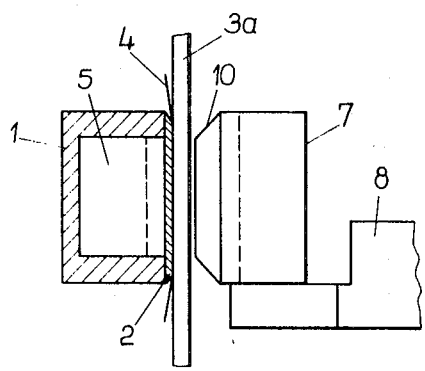
FIG. 2 is a schematic cross-sectional view along line II-II of FIG. 1.

Shuttle 1 has three horseshoe magnets 5 applied thereto. Horseshoe magnets 5 are permanent magnets, having pole pieces 6 directed towards the shuttle race 3. The reed elements 3a are made of nonmagnetic material. THe permanent magnets 5 are so arranged that a North pole is followed by a South pole, sequentially, that is, the polarity of the poles changes from pole to pole. The width of the pole is indicated at x, whereas the distance between poles is shown at y (FIG. 1). The spacing y is also maintained between magnets—see FIG. 1. Pole pieces, or pole end surfaces 6 of magnets 5 face three permanent magnets 7, located outside of the shed and supported on a support 8, only schematically indicated. Support 8 is movable in a direction parallel to the plane formed by warp threads 4, in a direction of arrow 9. The drive to move the carrier for the permanent magnets 7 is not shown, and may be conventional (as known in the art, for example as disclosed in the literature references above referred to). Permanent magnets 7 have a pole width $x$, and a pole distance $y$ corresponding to the respective values of magnets 5 on the shuttle 1. They are, likewise, arranged in such a manner that the polarity of the pole pieces changes sequentially, as seen in FIG. 1.

An airgap 11 separates, the pole surfaces 6 of permanent magnets 5 on the shuttle and the pole surfaces, or pole pieces 10 of permanent magnets 7 on carrier 8.

The permanent magnets 7 on carrier 8 cause a magnetic field in airgap 11 which has a multipolar direction, moving in the direction of carrier 8 and which may be designated as a magnetic guiding field, or transport field. This magnetic guiding, or transport field carries shuttle 1 along and guides and transports the shuttle across the shed.

The width $x$ of the pole pieces, and the polar distance $y$, and the gap width of airgap 11 are so arranged with respect to each other that attractive as well as repelling forces arise between adjacent magnet poles in the magnetic transport and guiding field. The attracting force between a North and an adjacent South pole when the shuttle is drive by motion of carrier 8; is indicated by the vector 12; the repelling force between this South pole and the adjacent South pole is indicated by vector 13. Forces 12, 13, can be resolved into components 12a, 13a, perpendicular to the surface of the warp, and into components 12b, 13b parallel to the warp surface. Resolution of the force vectors clearly indicates that the components 12a, 13a perpendicular to the warp surface are in opposite direction, so that the pressure of the shuttle 1 with respect to the slide surface 2 of shuttle race 3 is decreased; the horizontal components 12b, 13b, which counteract any lag, or lack of synchronism, or mutual shift between shuttle 1 and the magnetic guiding and transport field are in phase, so that the lateral severing force between the field and the shuttle is high, thus securely holding the shuttle in the field. Any slip between the shuttle 1 and the field caused by the magnets on carrier 8, beyond the position of FIG. 3 for example due to friction or resistance to moving of the shuttle will cause an increase of the repelling force between like magnet poles, so that the severing force will increase up to a certain limiting value. The pole surfaces 10 of the permanent magnet 7 may be formed with pole pieces so designed that a concentration of magnetic flux is obtained and that the magnetic field between the magnets 7 and shuttle 5 is concentrated to provide for improved transfer of force. These pole pieces may be bevelled, or the cross-sectional area can be decreased in the region of the pole pieces to increase the flux density of the field facing the shuttle.

The present invention has been illustrated in schematic form, and any unnecessary parts for a full understanding of the inventive concept have been left off. Various structural arrangements for moving carrier 8 in the direction of arrow 9 are possible and the inventive concept can be applied to a variety of weaving looms.

The horseshoe magnets 5 may be applied to the side surface of the shuttle, as shown, but other arrangements of magnets are possible. Machines in which the present invention may be used are described in U.S. Patent Nos. 2,630,839, 2,799,295, 2,870,349, 3,224,465, 3,233,633, 3,263,705 to which reference is made.

I claim:
1. Shuttle drive for continuously progressing shed-type weaving looms
   having a shuttle (1);
   a carrier (8) movable outside of the shed along the shuttle race (3) and in synchronism with desired shuttle movement and separated from the shuttle race by an airgap (11)
   a plurality of permanent magnets (5) having poles of alternate polarity located on the shuttle facing the carrier, the poles being of predetermined width $(x)$ and being separated from each other by uniform spacing $(y)$;
   and a plurality of permanent magnets (7) having poles of alternate polarity located on the carrier facing the shuttle to provide a travelling magnetic field, the poles being of said pole width $(x)$ and spacing $(y)$ and essentially similar to that of the shuttle, the relative magnetic field strengths provided by said magnetic means, and the width of the airgap (11) being set, with respect to each other, to provide attracting (12) and repelling (13) magnetic force interaction between adjacent fields of the shuttle and said travelling field and having force components (12b, 13b) in a direction of the shuttle movement which are additive to lock the shuttle to move in synchronism with said carrier (8).

2. Shuttle drive according to claim 1, wherein the shuttle travels over a shuttle race (3) and wherein the shuttle race is formed of nonmagnetic material, and the attracting (12a) and repelling (13a) force components between the magnets of the shuttle (5) and the magnets (7) of the carrier (8) are essentially equal and in opposite direction, so that force components exerted by the shuttle (1) against the shuttle race (3) will tend to cancel.

3. Shuttle drive according to claim 1, wherein the magnets (5) on the shuttle (1) are a plurality of adjacently located, spaced horseshoe-type magnets.

4. Shuttle drive according to claim 1, wherein the magnets (7) on the carrier (8) have pole surfaces (10) shaped to provide for concentration of the magnetic flux from said magnets.

5. Shuttle drive according to claim 1, wherein the permanent magnets (5) on the shuttle are a plurality of horseshoe-type magnets located at the side surface of the shuttle.

6. Shuttle drive according to claim 1, wherein the shuttle race has reed elements (3a); and the reed elements are formed of nonmagnetic material.

* * * * *